Figure 1:
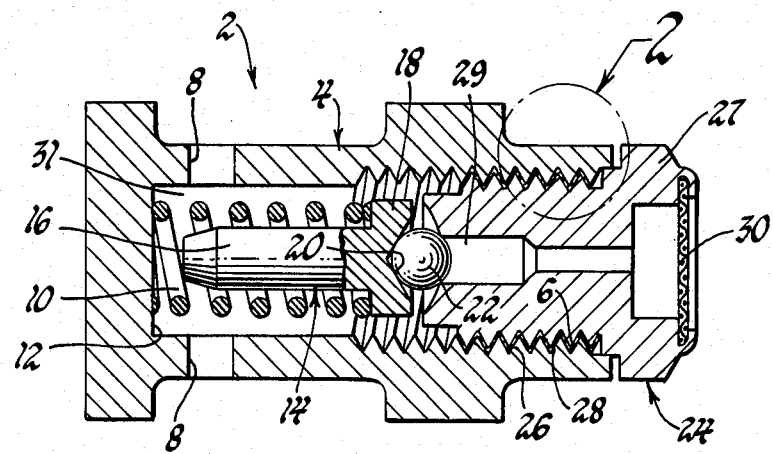

United States Patent [19]
Gray

[11] Patent Number: 4,644,023
[45] Date of Patent: Feb. 17, 1987

[54] HEAT CURABLE EPOXY ADHESIVE COMPOSITION

[75] Inventor: Richard K. Gray, Warren, Mich.

[73] Assignee: General Motors Corporation, Detroit, Mich.

[21] Appl. No.: 732,183

[22] Filed: May 9, 1985

[51] Int. Cl.$^4$ .............................................. C09J 5/02
[52] U.S. Cl. .................................. 523/176; 525/482; 525/486; 525/524
[58] Field of Search .................. 525/482, 486, 524; 523/176

[56] References Cited
U.S. PATENT DOCUMENTS 4,544,432  10/1985  Roister et al. .................. 525/482

Primary Examiner—John Kight
Assistant Examiner—M. L. Moore
Attorney, Agent, or Firm—Elizabeth F. Harasek

[57] ABSTRACT

A heat curable epoxy adhesive composition has been developed which is substantially insoluble in cold hydraulic fluid before it is cured and resistant to degradation in hot hydraulic fluid after it is heat cured. The adhesive comprises a diglycidyl ether of bisphenol-A, a lesser amount of an epoxy novolac resin and a catalytic amount of 2-ethyl-4-methyl imidazole curing agent. The adhesive is particularly adapted to automatically and permanently calibrate the relief pressure of check valves in hydraulic systems.

1 Claim, 2 Drawing Figures

HEAT CURABLE EPOXY ADHESIVE COMPOSITION

This invention relates to heat-cured epoxy compositions which are resistant to degradation by hydraulic fluid at high temperatures and pressures. The invention has particular application for the automatic calibration of relief valves incorporated in automotive power steering pumps.

Relief valve assemblies are a constituent of most high pressure hydraulic systems. A well known application for such valves is in the hydraulic power steering systems of automotive vehicles. See, for example, U.S. Pat. No. 2,997,962 which is incorporated herein by reference. The patent is assigned to General Motors and shows a typical relief valve located within the body of a power steering pump.

Automotive power steering relief valves are generally check valves which have a seat that is threadingly engaged with a valve body. A check ball is biased against the seat by a coil spring which surrounds a ball plunger. The amount of pressure required to unseat the ball is a function of the compression of the spring.

Because of natural variation in coil springs, power steering check valves have been calibrated in the past by selecting a shim of a certain thickness and inserting it between the valve body and seat to get the desired amount of spring compression at torque-down values of at least about 5.7 Joules (50 inch-pounds). Calibrating check valves using shims was time consuming and allowed only quantum leaps in adjustment pressures corresponding to the shim thickness. This sometimes resulted variation in relief pressure from valve to valve. Thus it was desired to find a means for automatically and consistently calibrating check valve without using shims to compress the spring.

One method of doing this is to set the relief pressure automatically by screwing the valve seat and body together until the check ball unseats at the desired calibration pressure of about 1,100 to 1,400 p.s.i. (7.58 to 9.65 MPa). A hardenable liquid adhesive or thread-locking compound could be used to lock the valve seat and body together. However, during calibration room temperature hydraulic fluid is forced through the valve at the calibration pressure. This tends to flush uncured adhesive compositions out from between the valve body and seat. Even if the adhesive survives calibration and is cured, it must still survive hot, high pressure hydraulic fluid without deterioration. Before this invention, no known adhesive composition had characteristics before and after cure compatible with use as a thread locking agent for use in power steering valves or for any other application where an adhesive sees high pressure hydraulic fluids before and after cure. Accordingly, it is an object of this invention to provide a novel thread-locking composition for use in hydraulic systems.

The invention may be better understood in terms of a detailed description of preferred embodiments thereof which follow. In the figures, FIG. 1 shows a sectional view of a power steering relief valve wherein the valve body and seat are threadingly engaged.

Figure 2:
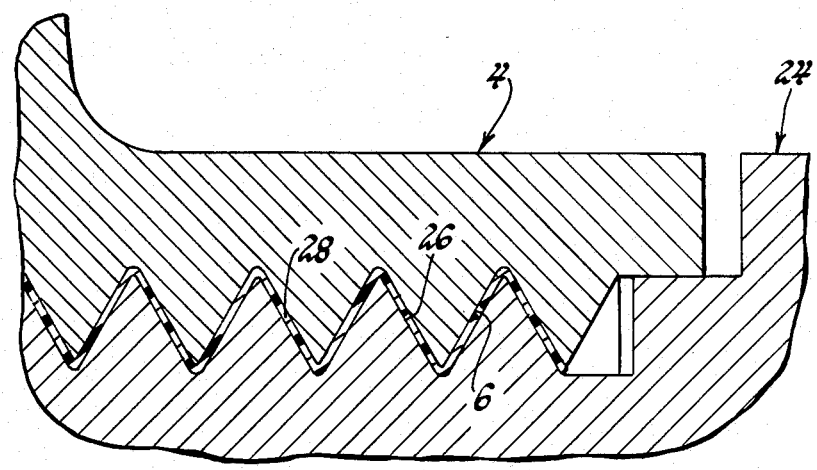

FIG. 2 is an enlarged section of FIG. 1 showing the subject thread-locking adhesive between the threads of the valve body and seat.

Referring to FIG. 1, a relief valve 2 for an automotive power steering system is shown in cross section. It comprises an annular valve body 4 with internal screw threads 6. Ports 8 are provided to vent hot hydraulic fluid that passes through the valve. Screen 30 prevents particulates carried in the hydraulic fluid from clogging the valve. A coil spring 10 is inserted below threads 6 and rests on the base 12 of valve body 4. Plunger 14 is positioned so that its narrow stem 16 extends into coils of spring 10 and so that its enlarged head 18 rests on top of spring 10. Plunger 14 has a conical groove 20 in head 18 to cradle check ball 22. Check ball 22 is retained against valve seat 24 by the compression of spring 10 against plunger 14. A portion of the outside surface of valve seat 24 is provided with threads 26 that complement threads 6 of valve body 4. The compression of spring 10 which controls the relief pressure required to unseat check ball 22 is controlled by the distance valve seat 24 is threaded into valve body 4.

To calibrate a valve, room temperature hydraulic fluid is forced into conduit 29 in valve seat 24 through screen 30. The integral nut 27 on valve seat 24 is turned until the compression of spring 10 is such that check ball 22 unseats at the desired pressure and the hydraulic fluid flows into conduit 31 in valve body 4 and out through ports 8.

As shown in FIG. 2, the subject invention relates to the application of a specially adapted adhesive 28 between threads 6 of valve body 4 and threads 26 of valve seat 24 which adhesive prevents relative motion between these parts after valve 2 has been calibrated and the adhesive cured.

In accordance with a preferred practice of the invention, a tiny drop of adhesive 28 is applied to thread 26 of the valve seat 24 before it is screwed into valve body 4. As the seat is screwed into the body, the adhesive is dispersed between the threads of the parts. An advantage of the thread locking composition of this invention is that it is substantially insoluble in room temperature hydraulic fluid and is therefore resistant to being flushed-out or diluted by the fluid before it is cured.

Once the calibrated relief pressure is achieved, valve 2 is heated to a temperature adequate to completely cure the adhesive. It is preferred to use induction heating since it is fast, efficient and relatively inexpensive.

While many different anaerobic adhesives and thermoplastic thread locking compounds were tried, the only one that stood up to the hot oil environment was based on a diglycidyl ether of bisphenol-A (DGEBA) mixed with a lesser amount of an epoxy novolac resin cured with 2-ethyl-4-methylimidazole curing agent.

The structure of DGEBA resins can be generally illustrated as

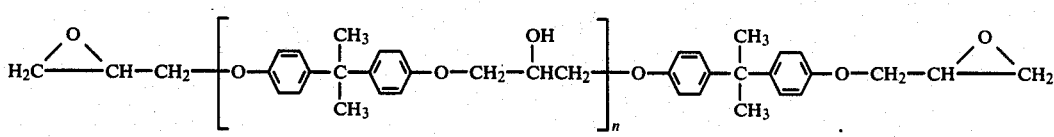

and has the IUPAC designation 2,2-bis[4-(2',3'-epoxy-propoxy)phenyl]propane. The preferred epoxy for the subject invention is Epi-Rez 510 marketed by Celanese Plastics and Specialities which is an undiluted DGEBA resin with an epoxy equivalent weight of about 180–200 and a viscosity of about 10,000–16,000 centapoise at 25° C. Similar resins are Epon 828 TM marketed by Shell and DER 331 TM marketed by Dow Chemical.

Epoxidized phenol formaldehyde based resins are known as novolacs. The preferred novolac for use in the subject invention is Epi-Rez SU 2.5 (marketed by Celanese Plastics and Specialties) or chemical equivalents thereof. The structure of such resins can be generally illustrated as

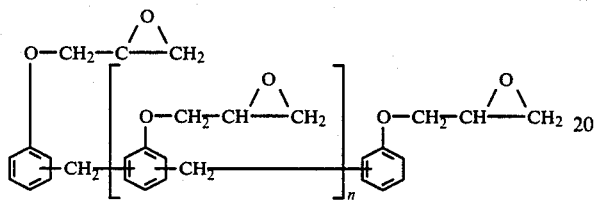

According to the marketing literature, Epi-Rez SU 2.5 has an epoxy equivalent weight of about 190 and a viscosity of about 2,700 centapoise at 52° and n averages about 0.5.

The preferred curing agent is 2-ethyl-4-methylimidazole which has the chemical structure

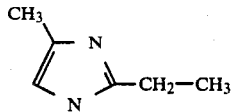

One such agent is EMI-24 sold by Fike Chemical. 2-ethyl-4-methylimidazole rapidly cures the DGEBA and novolac resins at a temperature above about 100° C. The subject adhesive is applied to the valve seat threads at room temperature and is then heated to permanently bond the valve body and seat together in their properly adjusted position.

The preferred proportion of constituents is about 3 to 4 parts by weight DGEBA for each part novolac. 2-ethyl-4-methylimidazole is incorporated in amounts of about 3 to 6 parts per 100 parts total resin. It is preferred to maintain the constituent ratios in these ranges to promote mixing and maintained dispersion of the high viscosity epoxy with the lower viscosity novolac and curing agent. These proportions may differ considerably consistent with the ability to automatically meter and deliver the resins, rapidly heat cure the adhesive, and with maintained resistance of the epoxy to hydraulic fluid.

EXAMPLE

Value assemblies like that shown in the FIG. 1 were assembled after application of a drop of an adhesive designated GM1, GM2, GM3 or Loctite TM to the threads of the valve seat. The valves and seats were made of machined steel. The respective adhesives were cured in the coil of a 5 kiloHertz induction heating unit for 10–15 seconds. The Loctite TM composition did not require heating and was not heat cured.

GM1 is a water emulsion of DGEBA epoxy resin to which about 4 parts per hundred weight parts resin dicyandiamide curing agent are added. The epoxy emulsion I used is marketed by Celanese Corporation under the designation CMD35201.

GM2 is a water emulsion of Epi-Rez SU 2.5 epoxy novolac catalyzed with about 6 parts per hundred weight parts resin of 1-(2-hydroxy propyl)2-methylimidazole. Loctite TM 495 is a commercially available threadlocking compound marketed by Loctite Corporation. It does not require heat cure.

GM3 is the preferred composition for the practice of the invention. Adhesive samples were made up of about 80 parts by weight Epi-Rez 510, 20 parts Epi-Rez SU 2.5 and 4 parts 2-ethyl-4-methylimidazole.

Measurements of the torque required to break the adhesive bond between the valve seat and body were taken with a dial torque wrench, zero to 250 inch-pounds (28 Joules) full scale. Each composition was tested at room temperature after cure. Additionally those with acceptably high adhesive strengths [above about 11.4 Joules (100 inch-pounds)] were exposed to air and immersed in hot power steering fluid, both at 204° C. (400° F.) for seven days.

Breakaway torque values were measured after the hot air and oil soaks. The results of these tests are shown in the table below.

TABLE I

| Adhesive Composition | Exposure Environment | Average Breakaway Torque (Joules) (inch-lbs.) | |
|---|---|---|---|
| GM1 | Room Temperature | 235 | 26.7 |
| GM1 | 204° C./7 days | 158 | 18.0 |
| GM1 | 204° C. + oil/7 days | 107 | 12.2 |
| GM1 | RT + oil/8 weeks | 55 | 6.3 |
| GM1 | Room Temperature | 98 | 11.1 |
| GM2 | Room Temperature | 100 | 11.4 |
| GM2 | 204° C./7 days | 115 | 13.1 |
| GM2 | 204° C. + oil/7 days | 47 | 5.3 |
| GM3 | Room Temperature | >250 | >28 |
| GM3 | 204° C./7 days | >250 | >28 |
| GM3 | 204° C. + oil/7 days | >250 | >28 |
| Loctite TM | Room Temperature | 30–40 | 3.4–4.6 |

The only composition that maintained its high bond strength in hot hydraulic fluid for seven days was the 2-ethyl-4-methylimidazole cured DGEBA-novolac formulation. It showed exceptional resistance to the hot oil environment in that breakaway torque exceeded 28 Joules (250 inch-pounds) after exposure to hydraulic fluid at 204° C. (400° F.) for seven days. A torque of at least about 100 inch-pounds is desirable to assure that a power steering relief valve will remain calibrated.

In summary, I have invented an adhesive which is particularly adapted to secure adjacent metal parts in systems exposed to hydraulic fluids. The adhesive is substantially insoluble with room temperature hydraulic fluid before it cures and is resistant to degradation by high temperature, hot hydraulic fluid after cure. It is particularly adapted to secure the complementary threads of valve stems and bodies in conjunction with pressure calibration of such valves.

While my invention has been described in terms of specific embodiments thereof, other forms may be readily adapted by one skilled in the art. Accordingly, the scope of the invention is to be limited only by the following claims.

The embodiments of the invention in which an exclusive property or privilege is claimed are defined as follows:

1. A heat curable adhesive composition which is substantially insoluble with cold hydraulic fluid before it is cured and resistant to degradation in hot hydraulic fluid after it is heat cured consisting essentially of an epoxy novolac resin, about three to four weight parts of a diglycidyl ether of bisphenol-A for each weight part said novolac resin, and about three to six weight parts 2-ethyl-4-methyl imidazole curing agent per 100 parts total resin.

* * * * *